United States Patent
Cavanagh et al.

(10) Patent No.: US 9,104,543 B1
(45) Date of Patent: Aug. 11, 2015

(54) DETERMINING LOCATIONS OF NETWORK FAILURES

(75) Inventors: Eoin F. Cavanagh, Dublin (IE); Michael S. Stewart, Dublin (IE); Karlton D. Sequeira, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 304 days.

(21) Appl. No.: 13/441,179

(22) Filed: Apr. 6, 2012

(51) Int. Cl.
*G06F 11/30* (2006.01)
*G06F 11/00* (2006.01)
*G06F 11/22* (2006.01)

(52) U.S. Cl.
CPC ............ *G06F 11/008* (2013.01); *G06F 11/221* (2013.01)

(58) Field of Classification Search
CPC .... G06F 11/006; G06F 11/008; G06F 11/221
USPC .......................................................... 714/43
See application file for complete search history.

(56) References Cited

U.S. PATENT DOCUMENTS

| | | |
|---|---|---|
| 5,832,225 A | 11/1998 | Hacherl et al. |
| 5,864,662 A | 1/1999 | Brownmiller et al. |
| 6,185,612 B1 | 2/2001 | Jensen et al. |
| 6,654,914 B1 | 11/2003 | Kaffine et al. |
| 6,671,818 B1 | 12/2003 | Mikurak |
| 6,694,455 B1 | 2/2004 | Scrandis |
| 6,738,933 B2 | 5/2004 | Fraenkel et al. |
| 6,823,479 B1 | 11/2004 | McElhaney et al. |
| 6,901,530 B2 | 5/2005 | Cerami et al. |
| 6,909,741 B1 | 6/2005 | Smith et al. |
| 6,978,302 B1 | 12/2005 | Chisholm et al. |
| 6,981,039 B2 | 12/2005 | Cerami et al. |
| 7,016,313 B1 | 3/2006 | Harper |
| 7,134,135 B2 | 11/2006 | Cerami et al. |
| 7,251,055 B2 | 7/2007 | Sawada et al. |
| 7,260,060 B1 | 8/2007 | Abaye et al. |
| 7,385,924 B1 | 6/2008 | Riddle |
| 7,441,154 B2 | 10/2008 | Klotz et al. |
| 7,546,609 B2 | 6/2009 | Florissi et al. |
| 7,609,650 B2 | 10/2009 | Roskowski et al. |
| 7,706,373 B2 | 4/2010 | Xu et al. |
| 7,751,350 B1 | 7/2010 | Pabst |
| 7,788,536 B1 | 8/2010 | Qureshi et al. |
| 7,844,730 B2 * | 11/2010 | Kawaguchi .................. 709/238 |
| 7,936,694 B2 | 5/2011 | Choudhury |

(Continued)

OTHER PUBLICATIONS

Batsakis, Alexandros et al., "Practical Passive Lossy Link Inference", Proc. of PAM 2005, 2005.

(Continued)

*Primary Examiner* — Chae Ko
(74) *Attorney, Agent, or Firm* — Knobbe, Martens, Olson & Bear, LLP (57) ABSTRACT

Generally described, systems and methods are provided for detecting locations of failures of network paths. The system collects information from a plurality of nodes and links in a network, aggregates the collected performance information across paths in the network, processes the aggregated performance information for detecting failures on the paths, and determines at least one location for network failures. In some aspects, processing the aggregated information may include determining the performance information on each of the nodes and links in the network. The performance information on each of the nodes and links may be determined by application of a stochastic gradient descent (SGD) technique.

17 Claims, 7 Drawing Sheets

(56) References Cited

U.S. PATENT DOCUMENTS

| | | | |
|---|---|---|---|
| 7,949,739 B2 | 5/2011 | Florissi et al. | |
| 7,953,020 B2 | 5/2011 | Breslau et al. | |
| 8,018,844 B2 | 9/2011 | Bender et al. | |
| 8,196,199 B2 | 6/2012 | Hrastar et al. | |
| 8,223,655 B2 | 7/2012 | Heinz et al. | |
| 8,300,554 B1 | 10/2012 | Vijendra et al. | |
| 8,375,244 B2 | 2/2013 | Bobak et al. | |
| 8,433,894 B2 | 4/2013 | Reznik et al. | |
| 8,520,556 B2 | 8/2013 | Karuppiah et al. | |
| 2002/0010735 A1 | 1/2002 | McMillen et al. | |
| 2002/0016856 A1 | 2/2002 | Tallegas et al. | |
| 2002/0107980 A1* | 8/2002 | Kawaguchi | 709/238 |
| 2004/0034614 A1 | 2/2004 | Asher et al. | |
| 2004/0044764 A1 | 3/2004 | Padmanabhan et al. | |
| 2004/0044765 A1 | 3/2004 | Meek et al. | |
| 2005/0091361 A1 | 4/2005 | Bernstein et al. | |
| 2005/0169185 A1 | 8/2005 | Qiu et al. | |
| 2005/0210132 A1 | 9/2005 | Florissi et al. | |
| 2006/0007870 A1 | 1/2006 | Roskowski et al. | |
| 2006/0107086 A1* | 5/2006 | Walker et al. | 714/4 |
| 2006/0259984 A1* | 11/2006 | Juneau | 726/28 |
| 2007/0047453 A1 | 3/2007 | Bender et al. | |
| 2007/0053283 A1 | 3/2007 | Bidwell et al. | |
| 2008/0148099 A1* | 6/2008 | Bhat et al. | 714/25 |
| 2008/0186866 A1* | 8/2008 | Morinaga et al. | 370/247 |
| 2008/0205263 A1* | 8/2008 | Cooley et al. | 370/218 |
| 2008/0253295 A1* | 10/2008 | Yumoto et al. | 370/245 |
| 2008/0298271 A1* | 12/2008 | Morinaga et al. | 370/252 |
| 2009/0037771 A1 | 2/2009 | Morse et al. | |
| 2009/0067483 A1* | 3/2009 | Casas et al. | 375/232 |
| 2009/0086643 A1* | 4/2009 | Kotrla et al. | 370/248 |
| 2009/0116404 A1 | 5/2009 | Mahop et al. | |
| 2009/0271513 A1* | 10/2009 | Liu et al. | 709/224 |
| 2009/0285101 A1 | 11/2009 | Lu | |
| 2009/0290497 A1 | 11/2009 | Gibbings | |
| 2010/0067396 A1* | 3/2010 | Cui et al. | 370/252 |
| 2010/0121910 A1* | 5/2010 | Kim | 709/203 |
| 2010/0157516 A1 | 6/2010 | Doorhy et al. | |
| 2010/0165849 A1 | 7/2010 | Eisenberg et al. | |
| 2010/0246408 A1* | 9/2010 | Kerber et al. | 370/242 |
| 2010/0278056 A1 | 11/2010 | Meloche et al. | |
| 2010/0316373 A1* | 12/2010 | Chang et al. | 398/12 |
| 2011/0007629 A1 | 1/2011 | Atlas et al. | |
| 2011/0063979 A1 | 3/2011 | Matthews et al. | |
| 2011/0063986 A1 | 3/2011 | Denecheau et al. | |
| 2011/0078291 A1 | 3/2011 | Bickson et al. | |
| 2011/0096675 A1* | 4/2011 | Li et al. | 370/252 |
| 2011/0164502 A1* | 7/2011 | Mohan et al. | 370/236.2 |
| 2011/0199911 A1* | 8/2011 | Ikada | 370/242 |
| 2012/0106561 A1 | 5/2012 | Horio | |
| 2012/0109600 A1* | 5/2012 | Saeed et al. | 703/2 |
| 2012/0182864 A1 | 7/2012 | Heinz et al. | |
| 2012/0213224 A1 | 8/2012 | Chen | |
| 2012/0239256 A1 | 9/2012 | Hammerschmidt et al. | |
| 2012/0320784 A1 | 12/2012 | Edwards et al. | |
| 2012/0327765 A1 | 12/2012 | Gibbings | |
| 2013/0064075 A1* | 3/2013 | Pu | 370/225 |
| 2013/0070612 A1 | 3/2013 | Timus et al. | |
| 2013/0117272 A1 | 5/2013 | Barga et al. | |
| 2013/0308471 A1 | 11/2013 | Krzanowski et al. | |
| 2014/0098685 A1 | 4/2014 | Shattil | |

OTHER PUBLICATIONS

Bu, Tian et al., "Network tomography on general topologies", Proc. of the ACM SIGMETRICS, Jun. 2002.

Coates, Mark, et al., "Network inference from passive unicast measurements", Rice University, ECE Department, Technical Report TR-0002, Jan. 21, 2000.

Czepiel, Scott, "Maximum Likelihood Estimation of Logistic Regression Models: Theory and Implementation", http://czep.net/stat/mlelr.pdf, available as of Feb. 5, 2005 according to Internet Archive.

Kniaz, Krzysztof, "Non-gradient optimization techniques (Nelder-Mead and Rosenbrock)", http://www.kniaz.net/software/rosnm.aspx, May 2009.

Salakhutdinov, Ruslan, et al., "Optimization with EM and Expectation-conjugate-gradient", Proceedings of the Twentieth International Conference on Machine Learning (ICML-2003), Washington DC, 2003.

Sauro, Jeff, "What's a Z-score and why use it in usability testing?", http://www.measuringusability.com/z.htm, Sep. 17, 2004.

Sharman, K.C., "Maximum likelihood parameters estimation by simulated annealing", International Conference on Acoustics, Speech, and Signal Processing, pp. 2741-2744, Apr. 1988.

Tachibana, Atsuo et al., "Empirical study on locating congested segments over the Internet based on multiple end-to-end path measurements", Proc. IEEE/IPSG International Symposium on Applications and the Internet (SAINT 2005), Jan. 2005.

Tsang, Yolanda et al., "Passive network tomography using EM algorithms", 2001 IEEE International Conference on Acoustics, Speech, and Signal Processing, Proceedings, vol. VI, May 2001.

* cited by examiner

DETERMINING LOCATIONS OF NETWORK FAILURES

BACKGROUND

Computer networks generally comprise various interconnected computing devices that can exchange data. Computing devices in a computer network can be in direct communication with one or more other computing devices. Each direct communication connection between computing devices in a computer network is generally referred to as a network link, or link. While a computer network is generally made up of a number of links, computing devices in a computer network do not typically include links to every other computing device in a computer network. Rather, data to be exchanged between computing devices can be subdivided into packets and propagated via the computer network to eventually reach an intended recipient, regardless of whether there is a direct link between the sender and recipient.

More specifically, packets of data are typically transmitted from an origin computing device to an identified destination computing device. If a packet of data is received by a computing device that is not the identified destination computing device, the receiving computing device becomes an intermediary in the communication path between the origin computing device and the destination computing device by forwarding the packet to another computing device in the computer network. Accordingly, each packet of data is transmitted through a series of intermediate links in the computer network until the packet reaches its destination computing device. The series of links for delivery of a packet of data between an origin computing device and a destination computing device is generally referred to as a network path, or path.

At each computing device in a communication network, an independent decision may be made regarding the path to the identified destination computing device for each received data packet. Each computing device can use several factors for making the decision regarding the path to the identified decision. For example, in some networks, portions of the destination address included in the data packet may be used to compare to a lookup table on the computing device. Based on the independent decision, a receiving computing device transmits a received data packet on the next intermediate link in the path.

Indications of total traffic on any one link in the network may be obtained by measuring packets transmitted or received on the two computing devices connected by that link. As networks become increasingly complex, network operators may desire to obtain information regarding the performance of paths in the network, rather than indications of total traffic on individual links. The performance of paths in the network may include a view of the interconnection between all the computing devices in the network. Performance of the paths may also include indications of network availability or failures, which may include an indication of dropped or lost packets, an indication of service degradation, or even of a network halt due to excessive traffic.

Network operators generally wish to ensure the highest availability possible for their network at the lowest cost possible. Problems relating to network failures generally affect the availability of the networks, and the costs associated with resolving the network failures affect the operators' overall costs.

Therefore, network operators typically wish to be able to accurately estimate the location of failures in their networks as quickly as possible in order to maintain costs low and availability high. The location of failures may be, for example the devices or links whose failure or impaired operation is resulting in packets not reaching their desired destinations. There exist various tools to detect when network failures occur on a network. However, it may be difficult to find the location of those failures. For example, in some situations, several different components in the network may be affected by the same cause of failure. In other situations, several causes of failures may affect the same network component. In either of these circumstances, a network failure should be detected. As networks increase in size and complexity, determining the location of those failures becomes more difficult.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, aspects of the present disclosure relate to the management of information related to locations of network failures. As discussed above, network operators may desire to isolate any network issues down to devices and links in the networks in order to take remedial action. Aspects of the present disclosure enable the finding of locations of failures in networks by identifying the affected or impaired devices and links in the networks.

Specifically, in one aspect, the network failure location detection system collects performance information from a plurality of nodes and links in a network and aggregates the collected performance information across paths in the network. The network failure location detection system then processes the aggregated performance information to detect failures on the paths. Once failures are detected, the system analyzes each of the detected failures to determine at least one affected or impaired device or link for each of the failures. In some aspects, processing the aggregated information may include solving a set of equations for the performance indications on each of a plurality of paths in the network using Stochastic Gradient Descent (SGD).

Although various aspects of the disclosure will be described with regard to illustrative examples and embodiments, one skilled in the art will appreciate that the disclosed embodiments and examples should not be construed as limiting.

Figure 1A:
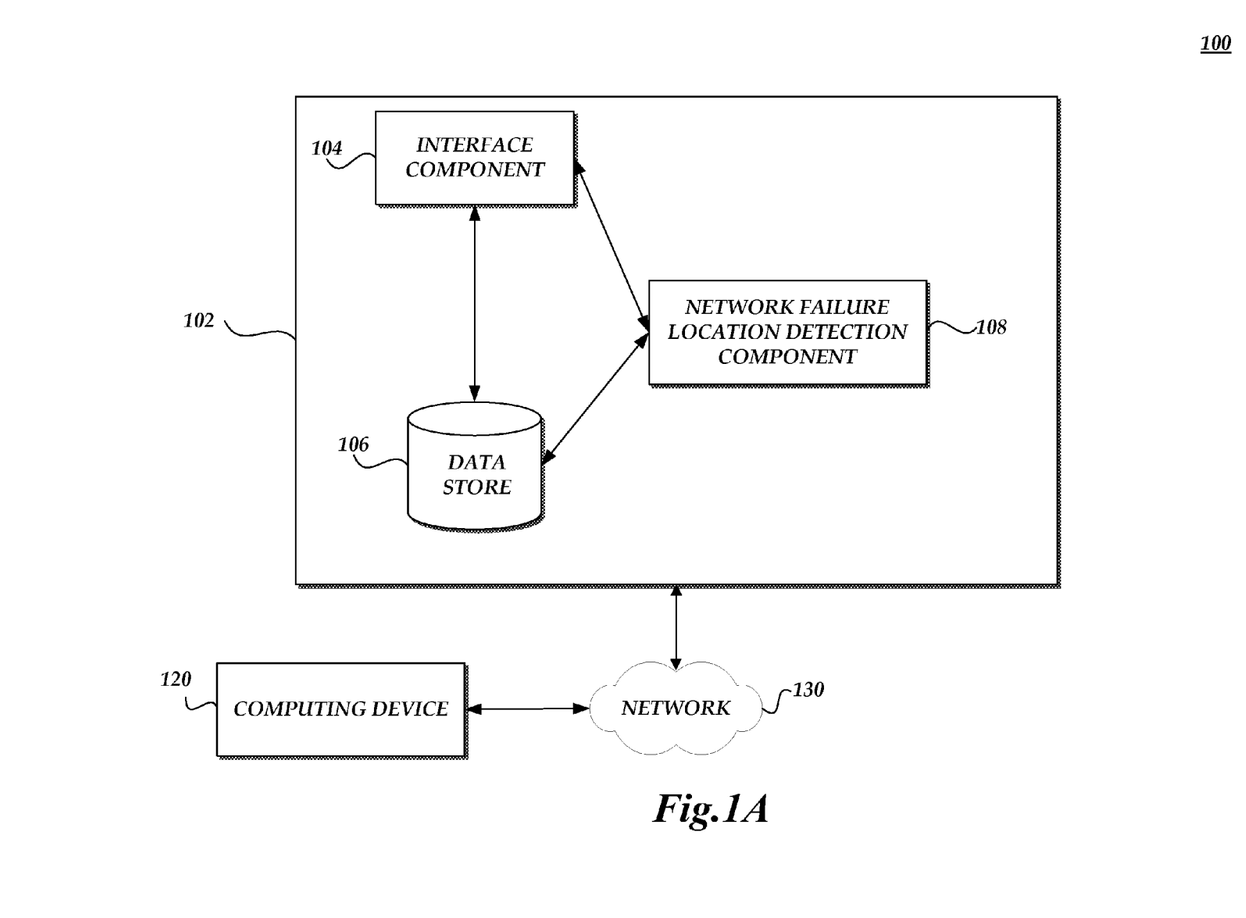
FIG. 1A is a block diagram depicting an illustrative embodiment of a computing environment implementing a network failure location determination system.

FIG. 1A is a block diagram depicting an illustrative embodiment of a computing environment 100 implementing a network failure location determination system 102. The network failure location determination system 102 includes a data store 106, an interface component 104, and a location detection component 108. The depicted environment 100 also includes a client computing device 120 communicatively connected by a network 110, such as the Internet. Those skilled in the art will recognize that the client computing device 120 may be any of a number of computing devices that are capable of communicating over a network including, but not limited to, a data center server, workstation, laptop, personal computer, tablet computer, electronic book reader, personal digital assistant (PDA), hybrid PDA/mobile phone, mobile phone, and the like. In some embodiments, the client computing device 120 may include computer hardware and software components. The computing environment 100 may also be collaborating with other network management systems in various data centers.

Figure 1B:
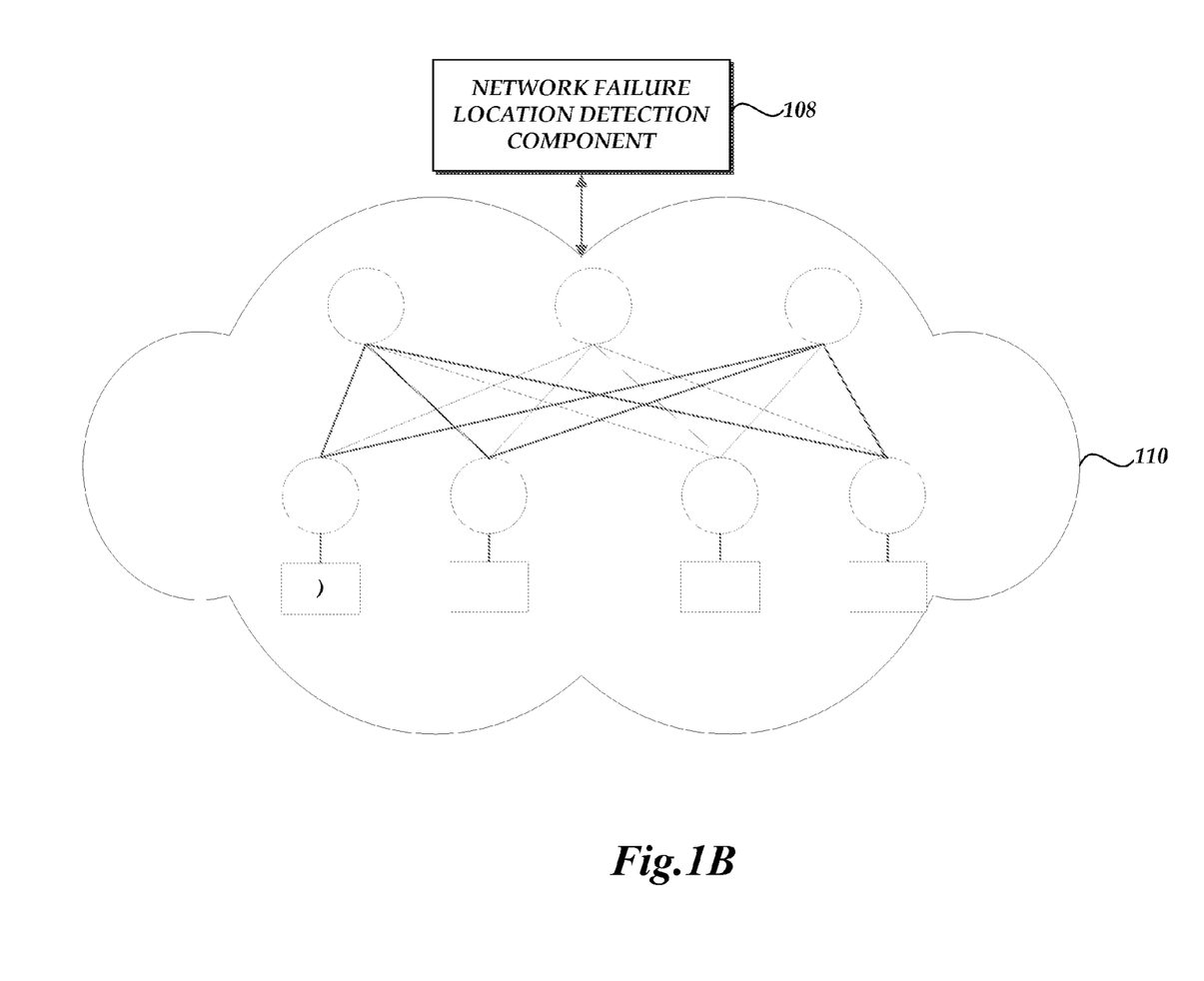
FIG. 1B is a block diagram depicting an illustrative interconnection between a network failure location detection component and a network of interconnected nodes.
Figure 2A:
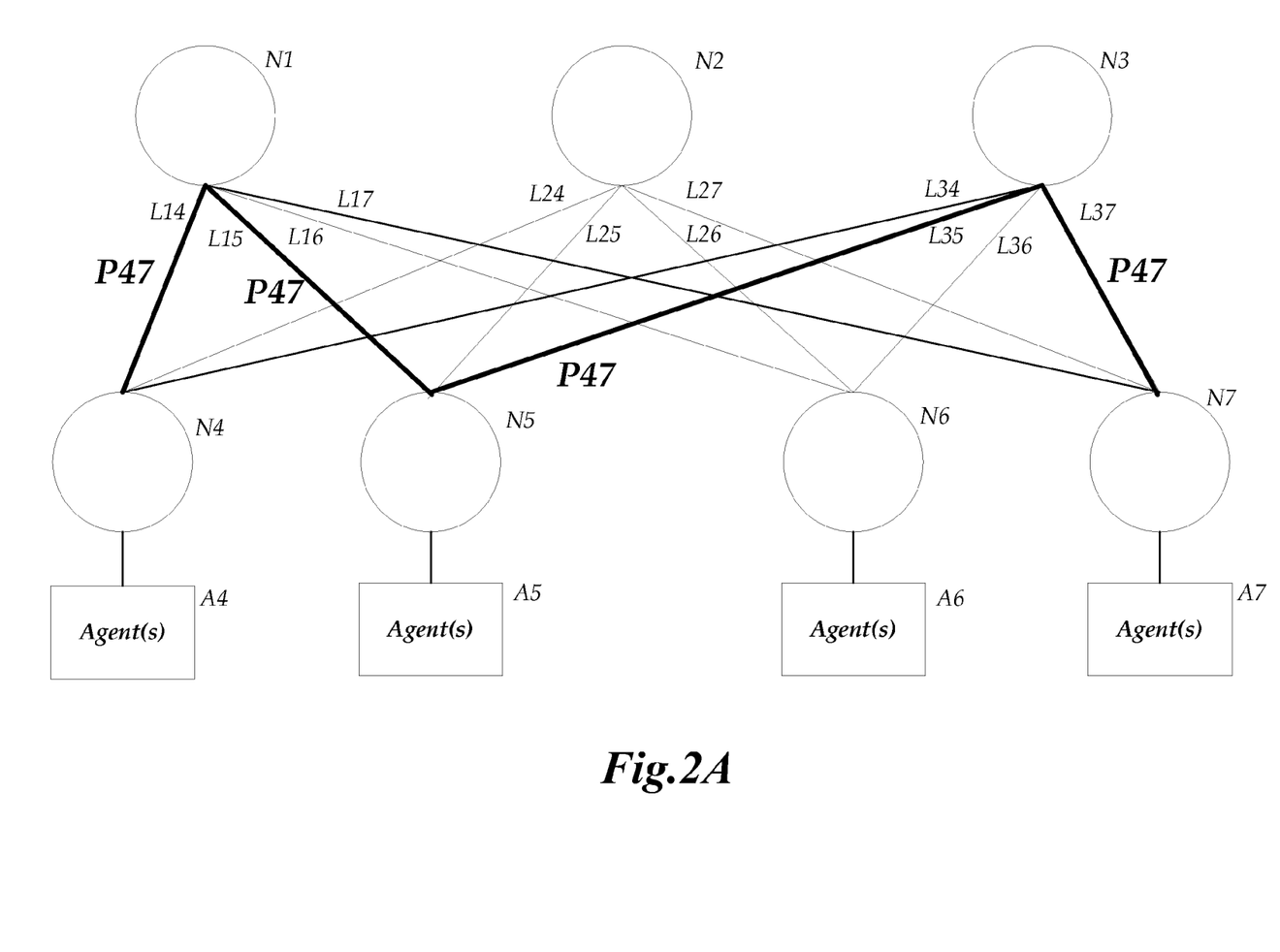
FIGS. 2A and 2B are schematic diagrams of an illustrative network topology defining various nodes, links, and paths.
Figure 2B:
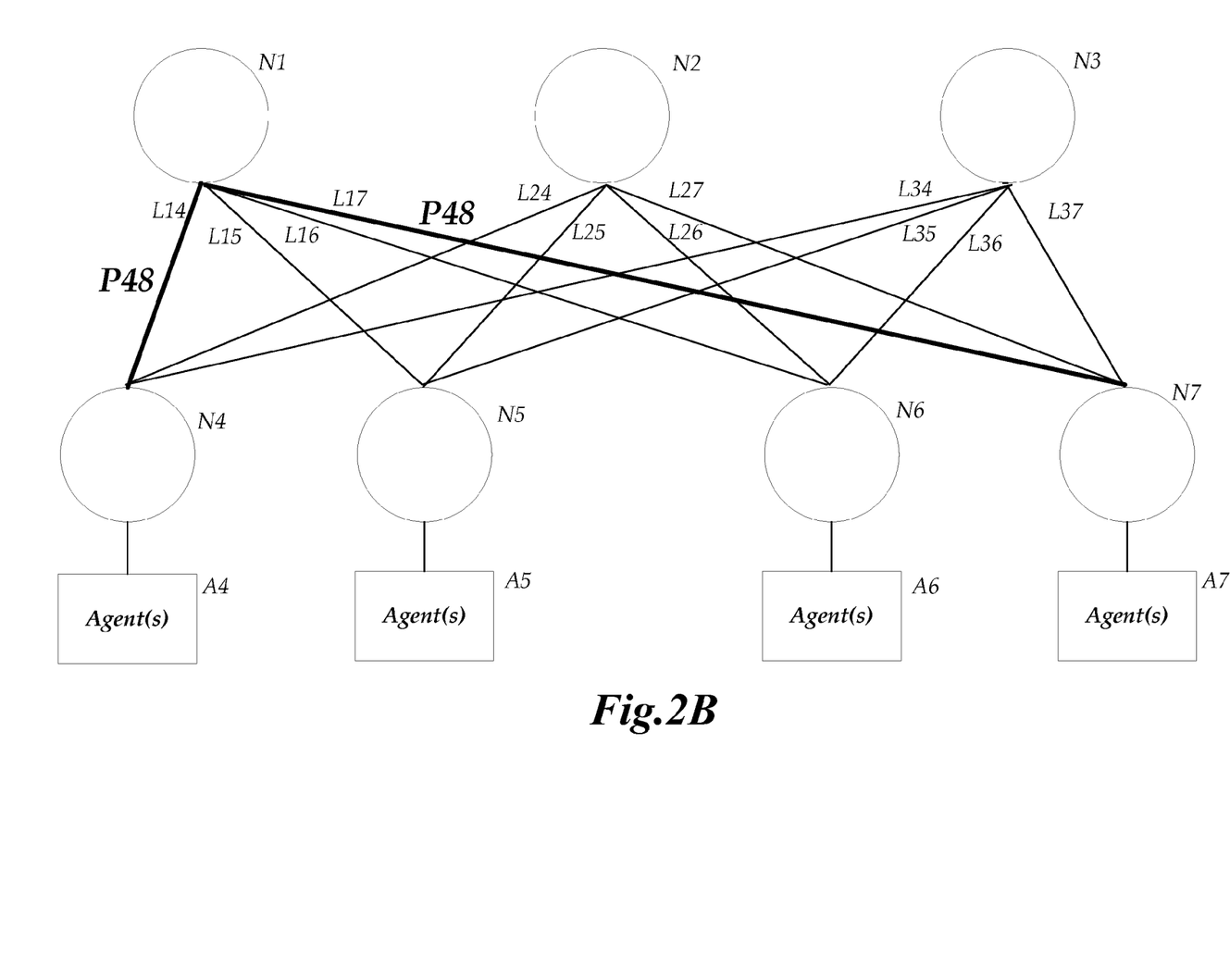

FIG. 1B is a block diagram depicting an illustrative interconnection between the network failure location detection component 108 and a network 110 of interconnected nodes. Illustratively, the network failure location detection component 108 of the network failure location determination system 102 may collect information from various nodes in a network 110 and aggregate the information collected. In various embodiments, the information collected may include paths taken between nodes in the network, as well as performance indices along the various paths. FIGS. 2A and 2B illustrate examples of nodes, links, and paths. The performance indices may include loss, latency of packets (including one-way and round-trip latency), dropped packets, bandwidth of links, and the like. Using the information collected and aggregated, the network failure location detection component 108 may process the information to determine the locations of packet losses or other failures observed in the network. The network failure location detection component 108 may also create a network topology which may be made available to be displayed on a client computing device 120 through the interface component 104. The network failure location detection component 108 may also store information collected and aggregated into the data store 106 for later retrieval and use.

FIGS. 2A and 2B are schematic diagrams of nodes, links, and paths in an illustrative network, such as for example network 110 illustrated in FIG. 1B. FIG. 2A illustrates nodes N1-N7, links L14-L17, L24-L27, and L34-L37, and path 47. As indicated, a direct connection between a pair of nodes consists of a link. Illustratively, nodes N1 and N4 are interconnected by link L14. Similarly, nodes N1 and N5 are interconnected by link L15. Illustratively, a connection between the nodes, such as link L14 between N1 and N4, may involve additional computing or networking components. However, such a link will be considered direct for the purposes of this disclosure.

In accordance with FIG. 2A, communications of data involves sending individual packets of data from an origin node (such as for example one of nodes N1-N7) to a destination node (such as for example another one of nodes N1-N7). A packet sent from an origin node to a destination node which is more than one link away from the origin node follows a path consisting of several links. For illustrative purposes, a packet from node N4 to node N7 may follow a path P47. Path P47 illustrated in FIG. 2A includes links L14, L15, L35, and L37.

Illustratively, the origin node does not specify the path in which a packet may or must travel. For illustrative purposes, for the packet travelling from node N4 to N7, N4 does not specify that the packet may or must travel through N1, N5, and N3. Rather, if a receiving node, such as node N1, which is an intermediary node, and is not the destination node N7, obtains a packet from N4, it transmits the packet to another node, such as N5 via a selected link, such as link L15. Accordingly, the results of each intermediary node (such as for example nodes N1, N5 and N3) forwarding a packet defines the path which the packet takes from N4 to N7. As such, the same intermediary node may forward successive packets along different links, which would result in the successive packets being forwarded to the destination node along different paths based on the selection of the link the intermediary node. With reference to FIG. 2B, another packet transmitted between node N4 and N7 may follow a path P48 including links L14 and L17. In contrast to path P47, the path P48 includes a path from node N4 to N1 and then to N7, with no other intermediary nodes.

One skilled in the relevant art will appreciate that networks monitored by the network failure location determination system 102 may include several more nodes than the illustrative network shown in FIGS. 2A and 2B. Accordingly, the number of potential paths and links between paths can vary greatly accordingly to the configuration of the nodes, generally referred to as the network topology.

FIGS. 2A and 2B also illustrate agents A4-A7 associated with nodes N4-N7. Each of the nodes in the network may be associated with an agent. The agent may be on the same device as the node, or on a separate device. In various aspects, the network failure location determination system 102 selects certain nodes, such as nodes N4-N7, in the network 110 to act as transmitters of messages to other nodes in the network 110 in order to test the reachability of those other nodes. The messages sent to the other nodes may consist of content-less messages. In some embodiments, the transmitters may use User Datagram Protocol (UDP) packets to send the content-less messages. In other embodiments, Transmission Control Protocol (TCP), Internet Control Message Protocol (ICMP), Infiniband (IB), or other types of packets may be used. The agents A4-A7 associated with each of the nodes N4-N7 may be used to transmit the content-less messages, to respond to the messages sent from transmitters, and also to collect responses received. The network failure location determination system 102 may then measure the round-trip time for messages sent from the transmitting nodes based on the response received from the agents. The network failure location determination system 102 may also measure the loss of packets between transmitting nodes and receiving nodes, by measuring packet transfer rates. Illustratively, the packet transfer rate may be represented by the percentage of packets transmitted from a source node which are successfully received by the destination node. Similarly, the packet loss rate may be the percentage of packets transmitted from a source node which are not successfully received by the destination node.

Figure 3:
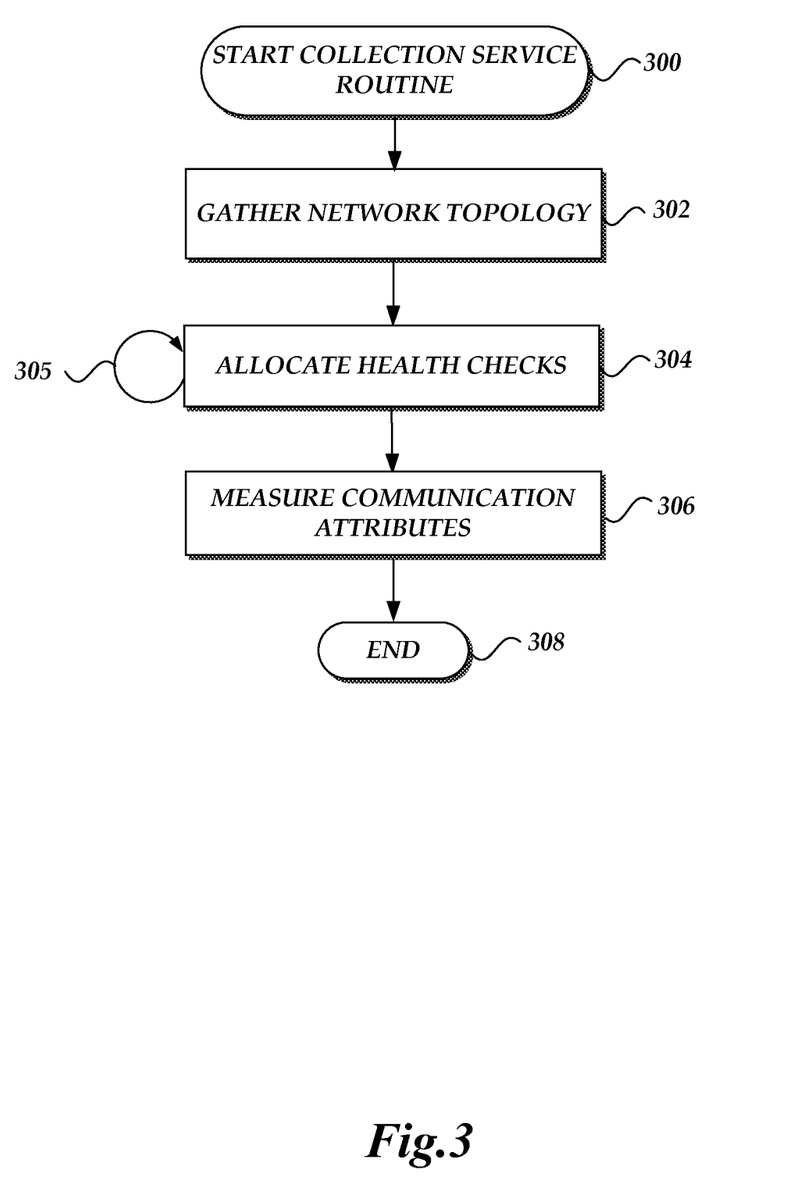
FIG. 3 is a flow diagram depicting an illustrative routine for collecting information from nodes in a network.

FIG. 3 is a flow diagram depicting an illustrative routine 300 for collecting information from nodes in a network. One skilled in the relevant art will appreciate that actions/steps outlined for routine 300 may be implemented by one or many computing devices/components that are associated with the network failure location detection component 108 (FIG. 1). Accordingly, the routine has been logically associated as being generally performed by the network failure location detection component 108, and thus the following illustrative embodiments would not be considered as limiting.

At block 302, the topology of the network is gathered, in order to be used for network failure location detection, as described further in connection with the routine 400 illustrated in FIG. 4 below. Illustratively, the agents (such as A4-A7 in FIGS. 2A and 2B) measure the route path and communication attributes through the network 110. Communication attributes may include various measurements such as, for example, transit times of packets sent through the network, packet transfer rate (PTR), and packet drop rate (PDR).

In order to determine whether there are any remaining paths for which data needs to be gathered, a rough knowledge of the network topology may be used. The rough knowledge of the network topology may be derived from querying router devices in the network to gather topology information such as information provided by various routing protocols, such as for example, Open Shortest Path First (OSPF) and Border Gateway Protocol (BGP). The rough knowledge of the topology may also be based on diagrams provided by network technicians. The diagrams provided may also be associated with various confidence levels. The rough knowledge of the topology may also be based on knowledge of the workflow of the build process for the network. For example, it may be known that the network was initially designed with a 100 nodes, and there was a planned expansion of a doubling of nodes in a given timeframe within a given geographic area. The topology may also be inferred from a combination of external sources, such as configuration files, technicians' information, automated switch building, subnet analysis, SNMP query information regarding run-time configuration states of devices, or other monitoring services. The topology of the network is gathered and stored. The topology may also be periodically validated to ensure it is up to date, and updated as necessary. Any topology changes observed may be used to trigger reallocation of health checks at block 304 described below. The topology gathered may be made available for display.

At block 304, health checks are allocated across the links in the network. In one embodiment, in order to not overload links in the network with health check information, the network failure location detection component 108 determines a minimum number of health checks across the network that may be necessary for adequate monitoring of the network. The minimum number of health checks may be related to the size of the network. The minimum number of health checks may also be related to the network operator objectives. The frequency of health checks may be set and adjusted in various ways. The frequency may be static, it may be manually adjusted, or it may also be dynamically adjusted based on business logic. The frequency of health checks may also be adjusted at block 305 based on topology changes observed in block 302 or based on frequency of such topology changes. The health check allocation may also be adjusted based on validation of the allocation strategy at block 404 described below with reference to FIG. 4. As described above, a path includes source and destination nodes, and a series of intermediate nodes and links between the nodes. Packets arriving at a node may await transmission to the next node according to the packet's protocol as handled by the node. If the memory of the node is full when a packet arrives, the packet may be discarded. Otherwise, the packet is held until it reaches the front of the queue and is then forwarded to the next node on the way to its destination. This waiting mechanism may be responsible for observed packet losses and for packet latencies. Other reasons may also contribute to packet losses or latencies.

A ping utility may be used to check if a remote device is operating and to determine network connectivity. The source device may send an Internet Control Message Protocol (ICMP) packet to the remote device's IP address. If the destination device is up and the network links are fine, the source device may receive a return an ICMP packet. Thus, the network failure location detection component 108 can collect data on roundtrip times and delays using the ping utility. Using other packet protocols, including for example TCP, UDP, and the like, may have different advantages and may be used in various embodiments. In some embodiments, transmitting a message with UDP packets instead of ICMP packets provides the added advantage of being able to manipulate paths between two endpoints.

The network failure location detection component 108 may manipulate paths between the two endpoints by manipulating port numbers. For example, the network failure location detection component 108 may manipulate paths in accordance with flow preserving next-hop packet forwarding protocols such as Equal Cost Multi-Path (ECMP). With ECMP, and similar flow preserving packet forwarding strategies, at each node in the network, the decision on which path to take to send a packet to the destination computing device is done independently, and is deterministically dependent on the source port number, the destination port number, the source IP address and the destination IP address. The use of UDP packets by the transmitters of the network failure location determination system 102 allows the packets to be re-routed as necessary to a path for which data needs to be gathered. The re-routing is enabled by manipulation of port numbers. Each node learns and takes a default flow through the nodes in the network to arrive at a given destination. By manipulating the destination port through the use of UDP packets, the intermediate packet forwarding devices can be forced into taking a different, desired path. Therefore, in the network failure location determination system 102, each link in the network 110 is covered by a sufficient number of paths in order to identify a failing link from a set of failing paths. The various paths covering a link may be achieved by using one or more of the agents on the nodes.

The strategy for allocating health checks across a network may include iterating through all the links in a network in order to meet a number of predetermined constraints. Examples of such constraints may include, for example, a minimum number of paths per link, or a maximum number of paths per link. In order to achieve a desired allocation coverage, the network failure location detection component 108 may simulate network data by sending probes from select agents in the network. It may be desired to throttle the frequency of health checks to manage the load generated on network links. However, a minimum number of health checks are necessary for adequate coverage and monitoring of the network. In order to accurately measure packets dropped or lost on links to nodes, each node is tested for reachability at an ideal frequency designed to keep the amount of data generated by the transmission of the messages to a workable level while accurately measuring packet loss. In some embodiments, a health check may be initiated every 100 milliseconds, or every 500 milliseconds, or every 5 seconds, or every 5 minutes, or any other suitable period of time according to business and/or other requirements of the network supported service.

Using the network topology previously gathered, each link in the network is iterated through in order to ensure that at least one path traverses the link. If a path is successfully allocated to a given link, a counter for all links on a path may be incremented by a certain value. If however if a path is not allocated to a link yet, then the health check allocation may be adjusted to achieve a desired path until all links achieve a target number of paths per link.

Once the health checks are allocated (and adjusted), then, at block 306, the communication attributes across the network are measured. The communication attributes may be measured on one-way or on round-trip paths. Since the different paths of the network are discovered during topology gathering at block 302, the route followed by a data packet is known based on the combination of the source IP and port and destination IP and port used in the packet. The time taken to send and receive the packet is recorded by the network failure location detection component 108. Once the communication attributes are measured on the various paths in the network 110, the routine ends at block 308.

Figure 4:
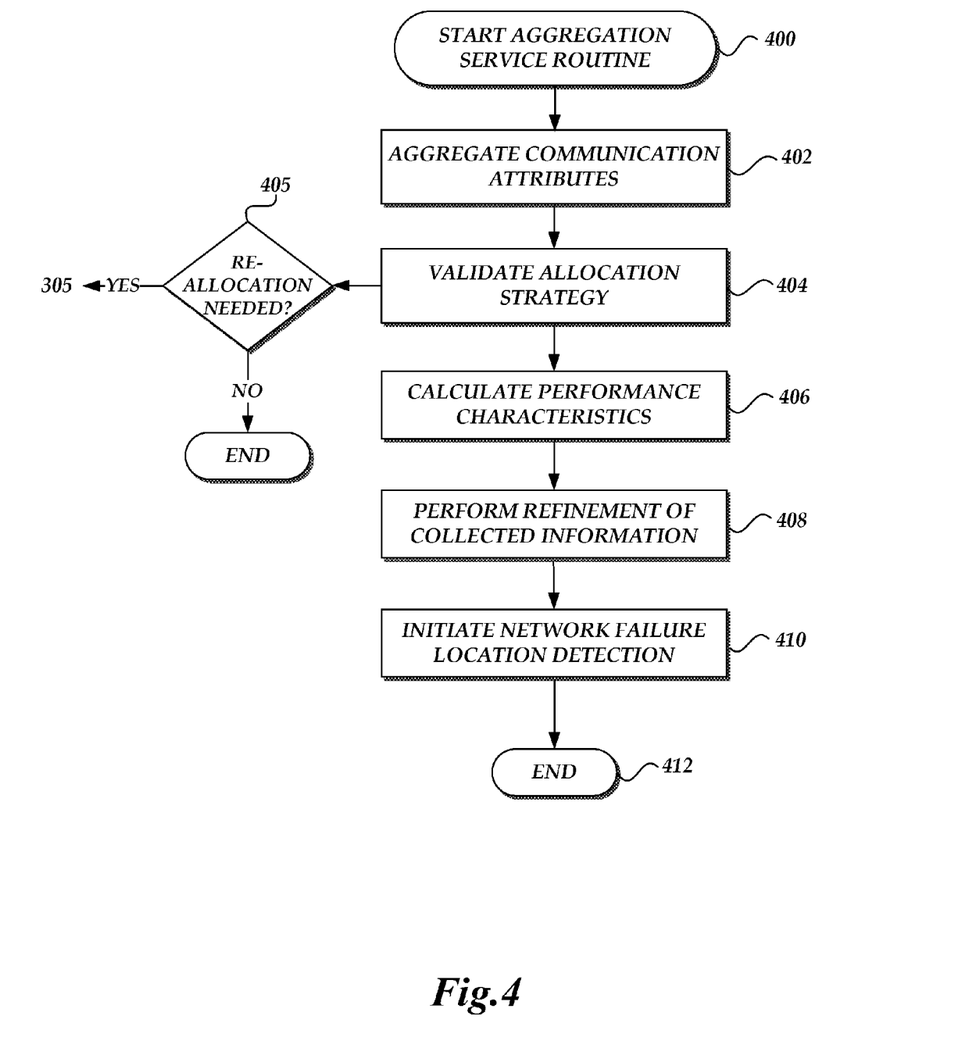
FIG. 4 is a flow diagram depicting an illustrative routine for aggregating information collected from nodes in a network.

FIG. 4 is a flow diagram depicting an illustrative routine 400 for aggregating information collected from nodes in the network 110 using the routine 300. One skilled in the relevant art will appreciate that actions/steps outlined for routine 400 may be implemented by one or many computing devices/components that are associated with the network failure location detection component 108. Accordingly, the routine has been logically associated as being generally performed by the network failure location detection component 108, and thus the following illustrative embodiments would not be considered as limiting.

At block 402, the communication attributes collected by each of the selected nodes are aggregated. Aggregation of the communication attributes enables reliable detection of failing paths. Data collected across several paths crossing the same node through different links or through packets sent from different transmitter nodes are aggregated. In some embodiments, the aggregation uses information from the gathered network topology.

At block 404 the communication attributes collected are used to determine whether the allocation strategy adopted is appropriate. The allocation strategy aims to provide adequate coverage of all the paths in the network. The communication attributes collected may indicate a need to adjust the allocation strategy in order to collect more path information. The health check frequency may thus be increased in some scenarios. In some scenarios, new paths may be allocated to one more different agents on the networks. At block 405, if it is determined that the health checks need to be reallocated, then the loop 305 of the routine 300 may be repeated.

At block 406, using the communication attributes aggregated, the network failure location detection component 108 calculates performance characteristics for the paths, using the network topology gathered at block 302 of the collection service routine 300. Performance characteristics may include indications of packet loss, latency, throughput, jitter and the like. The aggregation service may store the information collected and aggregated in a data store such as data store 106 illustrated in FIG. 1. The aggregation service may also create graphs to make available for display using the interface component 104 of FIG. 1. The graphs may display the performance characteristics in tabular format. The performance characteristics may also be displayed on the network topology representation. In some aspects, the performance and health characteristics may be overlaid on the network topology by the use of different colors, textures or other User Interface (UI) visualization elements for different link health or performance indications.

Using the network topology gathered at block 302 of the collection service routine 300, the aggregation service may iterate through all the links in the network topology in order to compute a percentage of links and nodes which indicate a failure. The links and nodes may be sorted by failure percentage.

At block 408, the aggregation service performs refinement of the collected information. Having calculated the performance characteristics over the paths on the network, the aggregation service may, using knowledge regarding the network topology, refine the collected information to reduce the amount of information used to perform network failure location detection. For example, a criterion for refinement may be to only consider paths on the network through which a predetermined percentage of the packets are transmitted. Another criterion for refinement may be to only consider paths which exhibit packet loss exceeding a predetermined threshold. An illustrative example of refinement may be to only perform network failure location detection if a predetermined percentage of paths through a node or link drop more than a predetermined percentage of packets. Other criteria may also be used for refining the communication, and one or more criteria may be used in conjunction with others. In some embodiments, the refinement of collected information may not be performed, and all of the collected information may be used to perform network failure location detection.

At block 410 the aggregation service initiates a network failure location detection subroutine, an example of which is described with respect to FIG. 5 below. Once the network failure location detection subroutine is initiated, the routine 400 ends at block 412.

Figure 5:
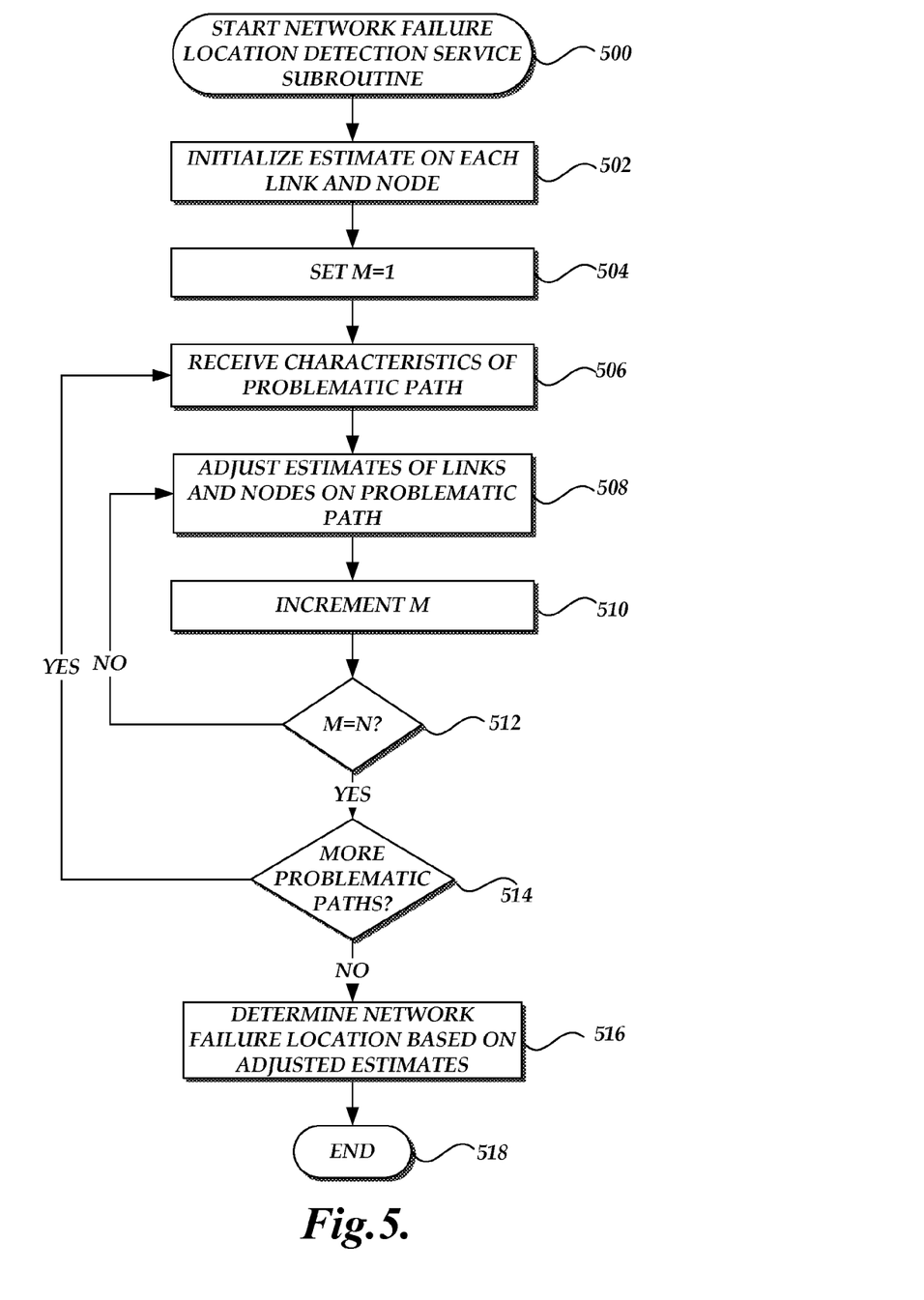
FIG. 5 is a flow diagram depicting an illustrative routine for detecting locations of network failures.

FIG. 5 is a flow diagram depicting an illustrative subroutine 500 for detecting locations of network failures. One skilled in the relevant art will appreciate that actions/steps outlined for routine 500 may be implemented by one or many computing devices/components that are associated with the network failure location detection component 108. Accordingly, the routine has been logically associated as being generally performed by the network failure location detection component 108, and thus the following illustrative embodiments would not be considered as limiting.

Generally described, the network failure location detection component 108 processes the aggregated data to determine the location of the detected failures. Candidate failures may be fully determined by the inference process leading to a most likely location, or otherwise the aggregation service may perform additional queries or analysis to isolate locations of failures. In some embodiments, the cause may be attributable to multiple simultaneous events.

In some embodiments, network failure location analysis may be performed by developing a set of equations given a performance indication across a path in order to solve for the performance indication for each link and node in the path. For example, one indication of performance may be loss. The loss may be represented by a packet loss rate. In some embodiments, the packet loss rate may be represented by the percentage of packets transmitted from one node and not successfully received by another node.

Another indication of performance may be latency. Latency includes the latency across a link connecting two nodes, as well as the latency of processing the network packets on each of the endpoint nodes. The total latency across a path may be equated to the sum of the latencies of each node on the path of a packet, and the latencies of each link on that path. Each value of latency may be an integer, or it may be represented by a statistical distribution aggregated from several sample measurements. By using the latencies across all paths for which data is aggregated, the latency of each node and each link may be solved for by solving the set of equations. Once an indication of the latency at each node and each link is known, it is possible to determine the location of failure by isolating the faulty link and/or node.

In order to perform efficient network failure location analysis, data for enough different paths needs to be collected, as indicated above. As the size of the network grows, the set of equations to be solved for becomes increasingly more complex. As information for more paths is collected, it becomes easier to isolate a link or a node in the network associated with a failure. Some other indications of performance may be packet loss, jitter, available bandwidth, and the like. In some embodiments, packet loss may be determined to be a threshold value of latency. For example, latencies over 100 ms may be considered to be packet losses. In other embodiments, latencies over different values may be considered to be packet losses.

Given the performance characteristics collected from various paths, a set of equations given an indication of performance across a path may be developed in order to solve for the performance indications for each link and node in the path. By using the indications across all paths for which data is aggregated, the health of each node and each link may be solved for by solving the set of equations. Therefore, in order to perform network failure location analysis, data for enough different paths needs to be collected.

In order to solve for the large set of equations developed, and thereby identify the locations of network failures, in some embodiments, an optimization method such as stochastic gradient descent (SGD) may be used. SGD may be used to minimize an objective function.

As an illustrative example, SGD may be used to determine the locations of network failures by determining the packet transfer rate (PTR) associated with nodes and links in the network. This determination may be done by minimizing an objective function associated with the loss across a path. The SGD may be iterated several times in order to minimize the objective function.

The PTR across a given path, or $PTR_{path}$, can be represented by the product of the PTR across each node and link across the path. In other embodiments, the latency across a given path may be represented by the sum of the latencies across each of the nodes and links. For simplicity, the nodes and links may be, individually and/or in combination, referred to as entities, and entities may be represented by e. Thus, the $PTR_{path}$ may be represented by the following equation:

$$PTR_{path} = \Pi_{e\ in\ path} PTR_e,$$

where $PTR_e$ represents the PTR across the respective entity.

Using information gathered across the paths, the PTR of a path may be an observed variable, whereas the PTR of each entity across the path cannot be observed. However, the PTR of each entity may be estimated, and SGD may be used to improve the estimates.

The following equation may be used to represent the value to minimize in order to arrive at the most accurate estimates for the PTRs of each entity:

$$L_p = |PTR_p - \Pi_{e\ in\ path} PTR_e|^2,$$

where $L_p$ is the value to be minimized, PTR is the observed PTR across a path, and $PTR_e$ is the estimated PTR across an entity.

The equation for $L_p$ simply represents the square error between the observed packet transfer rate and the estimated packet transfer rate across a path. In other embodiments, the equation for $L_p$ may be represented by the absolute value of the difference between the observed packet transfer rate and the estimated packet transfer rate across a path. In yet other embodiments, the loss function to be minimized might be represented by a different equation.

Given the $L_p$ as set forth above, then the estimate of the PTR across an entity is determined by iteratively solving the following equation:

$$PTR_{e\ in\ path} = PTR_e - \delta L_p / \delta e$$

where $-\delta L_p / \delta e$ may be referred to as the negative gradient.

An example application of SGD is illustrated in FIG. 5, where a general "estimate" for links and nodes in a network is shown. In some embodiments, the estimate may correspond to an estimate of the packet transfer rate (PTR) across the links and nodes. The SGD process illustrated may also be used to solve for other performance characteristics on the nodes and links.

Starting at block 502, the network failure location detection component 108 initializes the estimate for a given performance characteristic for each link and node in the network. In some embodiments, this initialization may equate the estimate to zero. In other embodiments, the estimate may be equated to other values. For example, in some embodiments, the initial value may be set to the average value of the performance characteristic measured across the paths in the network. In other embodiments, the initial value may be set to the median value of the performance characteristic measured across the paths in the network. In other embodiments, the initial value may be set to a specific percentile of the values of the performance characteristic measured across the paths in the network, starting from the lowest or the highest of such measured values. The percentile may be the tenth, twentieth, thirtieth, fiftieth, or any other percentile. Continuing with the example of the PTR, the PTR may be initialized to being zero across all links and nodes on the network.

Once the performance characteristic estimate is initialized on each link and node, the SGD process may be used to refine that estimate. In some embodiments, the SGD process may be iterated N times. N may be selected by the network operator for all cases, or it may be adjusted each time the network failure location detection subroutine is run. Referring to FIG. 5, at block 504, an iteration counter, M, is set to 1. Then, at block 506, performance characteristics of a path may be received as a result of the information calculated at block 406 and refined at block 408 described with reference to FIG. 4. For example, the network failure location detection component 108 may receive a calculated PTR for the path, which may be a value different from zero. Using the network topology information gathered, the links and nodes associated with that path may be determined, and the relevant set of equations associated with those links and nodes may be determined as well.

At block 508, the estimate of PTR across the relevant links and nodes is adjusted, given the PTR across the path. The adjustment of the estimate may be performed by SGD iterations, using the equations set forth above. Therefore, once the estimate is adjusted once, the iteration counter M is incremented at block 510, and at block 512, a determination is made to verify whether the predetermined number of N iterations has been reached. As long as the number of N iterations has not been reached, the estimate is adjusted at block 508. Through the iterations, the estimate for each node and link is updated in the direction of the negative gradient of the SGD until the square of the difference between the observed PTR across the path, and the PTR calculated for the path using the estimates of the PTR across the nodes and links across that path is minimized, or is zero. When the difference is thus minimized, the estimate of the PTRs for the nodes and links on the paths may be determined. The estimate of the PTR is thus refined through the iterations of SGD until the value estimated comes as close as possible to the value which would be observed. The refining through the iterations may be achieved by adjusting the learning rate of the SGD function. In some embodiments, the learning rates in successive iterations may be decayed, or become relatively smaller.

Once there are N iterations performed given the estimate on a path, then at block 514, the network failure location detection service verifies whether there are more problematic paths, or other paths for which an observed PTR is received. In some embodiments, the inclusion of other problematic paths in the network failure location detection routine may be based on the refinement criteria applied at block 406 described with reference to FIG. 4. If there are other problematic paths, the service returns to block 506 and repeats blocks 506-512 to determine estimates for nodes and links on each of the other problematic paths. The routine iterates through blocks 506-512 until there are no other problematic paths on the network.

Then, at block 516, based on the estimates of PTR calculated for each node and link on the problematic paths observed in the network, the network failure location detection service determines the locations of the network failures by identifying the most likely links and nodes to be impaired or affected. In some embodiments, the determination may be based on the estimates for the performance characteristic on a given node or link crossing a predetermined threshold. Once the locations are determined, then the subroutine 500 ends at block 518.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for detecting locations of network failures, the system comprising:
    a network failure location detection component comprising one or more computing devices configured to execute specific instructions, the network failure location detection component operable to:
        measure a communication attribute across each of a plurality of network paths between an origin node and a destination node in a network based on at least one packet delivered between the origin node and the destination node, wherein each one of the network paths includes at least two nodes and at least one link, and wherein the communication attribute is indicative of at least one network failure;
        for at least one path among the plurality of network paths, process the measured communication attribute measured for each of plurality of network paths to determine a respective communication attribute for each of the at least two nodes and the at least one link included in the at least one path;
        determine at least one location for the at least one network failure, among the at least two nodes and the at least one link included in the at least one path, based on the respective communication attribute of the at least two nodes and the at least one link in the at least one path, wherein the respective communication attribute is derived from the communication attribute measured based on at least one packet delivered between the origin node and the destination node;
        store at least one of the measured communication attributes, the determined communication attributes and the determined at least one location; and
        make available for display the determined at least one location.

2. The system of claim 1, wherein the network failure location detection component is operable to determine the respective communication attribute for each of the at least two nodes and the at least one link included in the at least one path by applying a stochastic gradient descent technique.

3. The system of claim 2, wherein applying a stochastic gradient descent technique comprises:
    initializing an estimate for the respective communication attribute associated with the at least two nodes and the at least one link; and
    adjusting the estimate for the respective communication attribute associated with the at least two nodes and the at least one link based on the measured communication attribute across the at least one path.

4. The system of claim 3, wherein initializing the estimate for the respective communication attribute associated with the at least two nodes and the at least one link is based on the measured communication attribute across the at least one path.

5. The system of claim 3, wherein the adjusting the estimate for the respective communication attribute is repeated for a number of iterations.

6. The system of claim 3, wherein adjusting the estimate is based on minimizing a loss function.

7. The system of claim 6, wherein the loss function is a square of a difference between the measured communication attribute across the at least one path and an estimated communication attribute across the at least one path.

8. The system of claim 7, wherein the estimated communication attribute across the at least one path comprises a product of the estimates of the respective communication attributes associated with the at least two nodes and the at least one link on the at least one path.

9. The system of claim 7, wherein the estimated communication attribute across the at least one path comprises a sum of the estimates of the respective communication attributes associated with the at least two nodes and the at least one link on the at least one path.

10. A computer-implemented method comprising:
measuring a communication attribute across each of a plurality of network paths from an origin node and a destination node in a network based on at least one packet delivered between the origin node and the destination node, wherein each one of the network paths includes at least two nodes and at least one link, and wherein the communication attribute is indicative of at least one network failure;
for at least one path from the plurality of network paths, processing the measured communication attribute across at least one path for determining a respective communication attribute for each of at least two nodes and at least one link included in the at least one path;
determining at least one location for the at least one network failure, among the at least two nodes and the at least one link included in the at least one path, based on the respective communication attributes associated with the at least two nodes and the at least one link on the at least one path, wherein each respective communication attribute is derived from the communication attribute measured based on at least one packet delivered between the origin node and the destination node.

11. The computer-implemented method of claim 10, wherein determining at least one location based on the determined respective communication attributes comprises identifying at least one of a node and a link with a determined respective communication attribute above a predetermined threshold for that communication attribute.

12. The computer-implemented method of claim 10, wherein the measured communication attribute is processed for only a subset of the plurality of network paths for which the communication attribute is measured.

13. The computer-implemented method of claim 12, wherein the subset is determined based on a value of the measured communication attribute.

14. The computer-implemented method of claim 10, wherein the communication attribute comprises a packet transfer rate.

15. A non-transitory, computer-readable medium having a computer-executable component, the computer-executable component comprising:
a network failure location detection component for:
determining a plurality of paths between two nodes in the network;
measuring performance indicators of the plurality of paths between the two nodes based on at least one packet delivered between the two nodes, wherein at least one of the performance indicators is indicative of at least one network failure;
processing a subset of the measured performance indicators to determine a respective communication attribute for components of a subset of the plurality of paths; and
determining at least one location associated with the at least one network failure, among the components of the subset of the plurality of paths, based on the respective communication attribute of the components, wherein the respective communication attribute is derived from the performance indicators measured based on at least one packet delivered between the two nodes.

16. The non-transitory, computer-readable medium of claim 14, wherein processing a subset of the measured performance indicators comprises selecting at least one of the plurality of paths based on the measured performance indicators.

17. The non-transitory, computer-readable medium of claim 16, wherein selecting a subset of the plurality of links based on the measured performance indicators comprises selecting a path for which respective measured performance indicator is below a predetermined threshold.

* * * * *